July 17, 1962
J. E. REGAN
3,044,481
AUTOMATIC PRESSURE FLUID ACCUMULATOR SYSTEM
Filed June 2, 1958
3 Sheets-Sheet 1
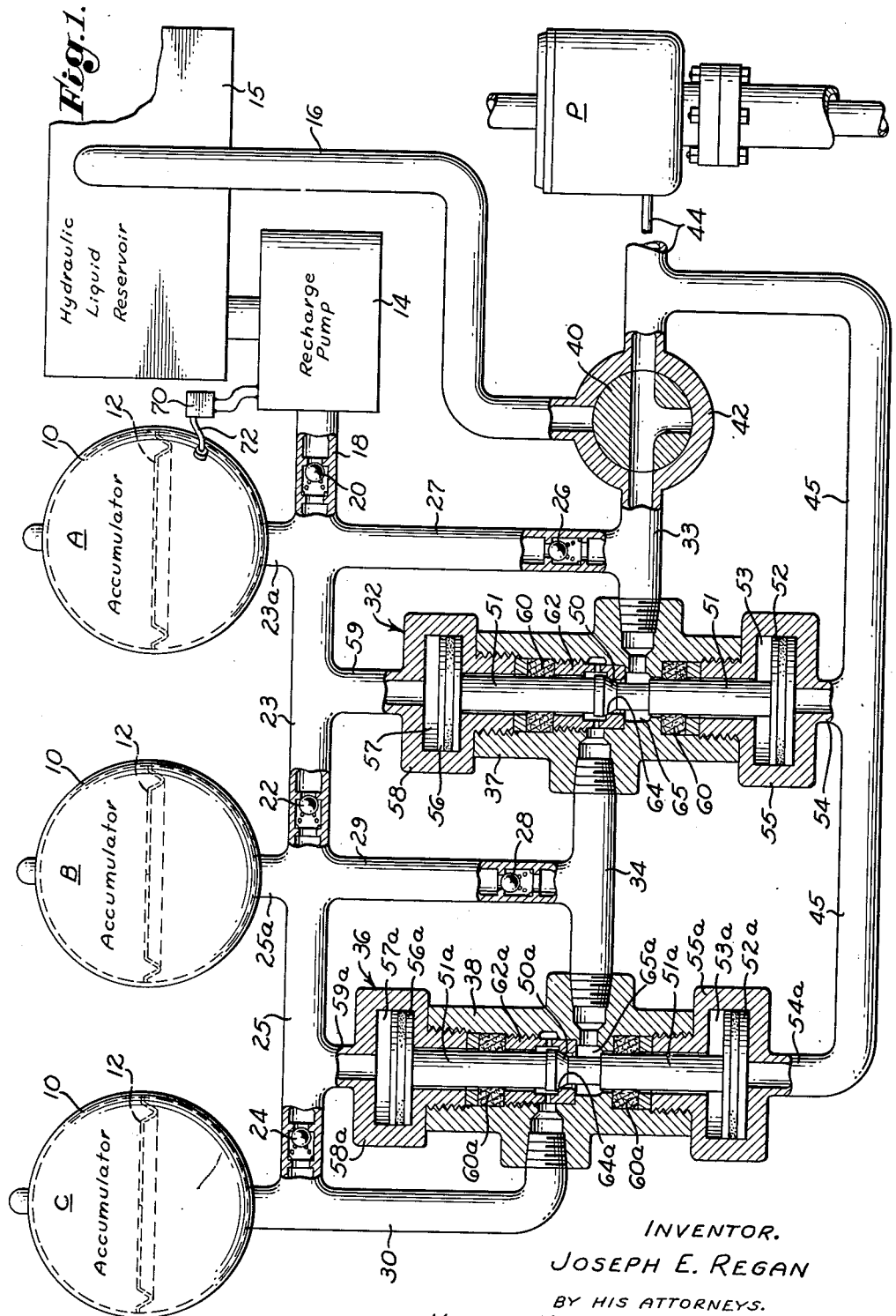
INVENTOR.
JOSEPH E. REGAN
BY HIS ATTORNEYS.
HARRIS, KIECH, FOSTER & HARRIS July 17, 1962  J. E. REGAN  3,044,481
AUTOMATIC PRESSURE FLUID ACCUMULATOR SYSTEM
Filed June 2, 1958  3 Sheets-Sheet 2
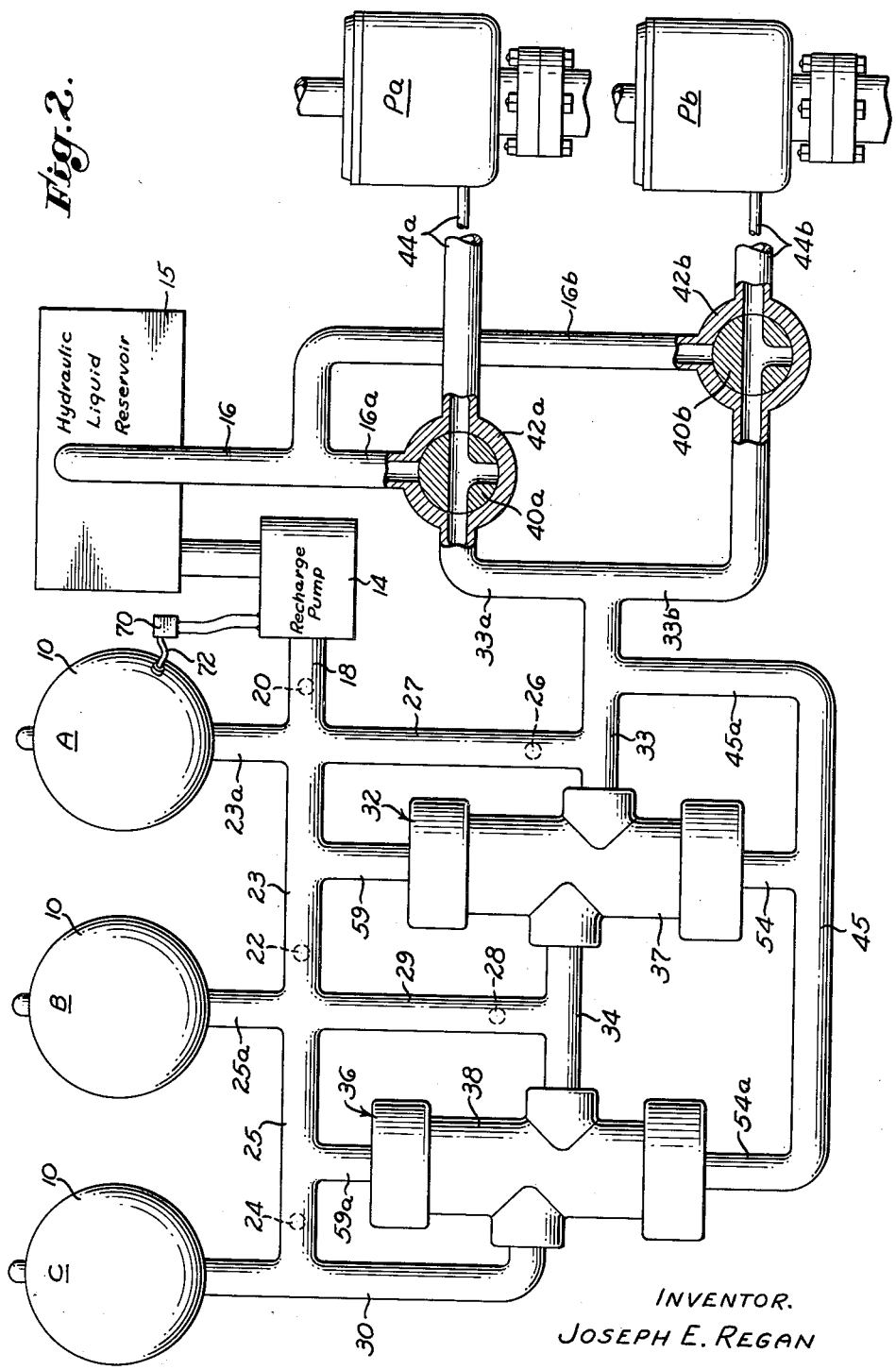

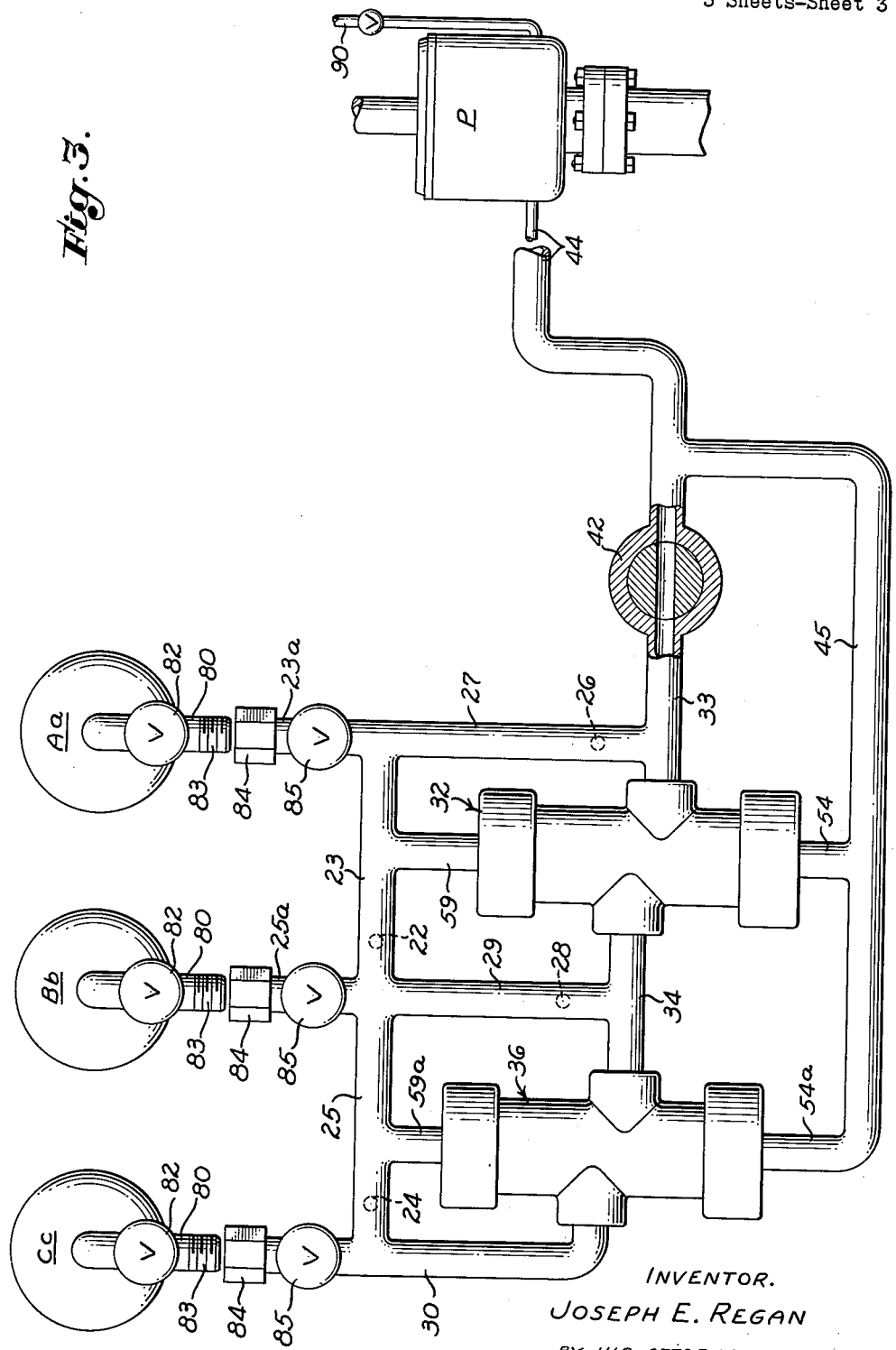

United States Patent Office 3,044,481
Patented July 17, 1962

3,044,481
AUTOMATIC PRESSURE FLUID ACCUMULATOR SYSTEM
Joseph E. Regan, San Pedro, Calif., assignor to Regan Forge and Engineering Company, San Pedro, Calif., a corporation of California
Filed June 2, 1958, Ser. No. 739,205
10 Claims. (Cl. 137—114)

This invention relates to systems for applying operating or control pressures, and more particularly to systems for hydraulically or pneumatically operating pressure controlled devices such as blowout preventers in oil fields.

In oil field practice involving oil and gas wells, many pieces of equipment typified by the indicated blowout preventers require hydraulic operation of devices which must be quickly closed to control, for example, unexpected pressures and prevent blowouts. Such hydraulic pressures must always be available and must be of sufficient magnitude to care for any developing condition. The usual system employed relies upon stored-up energy in conventional accumulators which employ tanks wherein compressed air or other gas, such as an inert gas, is provided above the hydraulic fluid to be used. Being subject to Boyle's law, upon withdrawal of the liquid from the bottoms of the tanks, the pressurizing gas immediately suffers loss of pressure and, if emergency withdrawals are heavy, the gas pressure sometimes drops to a dangerously low value. Under these conditions, the only safeguard has been oversize accumulators.

An object of this invention is to provide a high pressure hydraulic system wherein high pressure will always be available for high pressure emergency demand, and wherein low pressure demands will be met automatically by correspondingly low pressures substantially without disturbance to a higher pressure supply, which is thereby held in reserve for higher pressure demands or emergency demands but is made automatically effective when the higher pressure need is encountered.

Another object of the invention is to provide such a system in which a series of pressure units or vessels is provided, such units automatically coming into operation successively as preceding units are exhausted.

A still further object is to provide in such a system, means for commencing restoration of pressure in accumulators of the units when the pressure drops below a given minimum. Preferably, such commencement of pressure restoration is automatic upon a pressure drop in the first stage or unit of the series to a predetermined high minimum, all the successive units being connected so that, with adequate time, all units are brought up to the desired high maximum.

Thus, if, after emergency conditions have been met, not all units have yet been brought up to maximum pressure requirements, and a low pressure demand is required for another operation sufficient to be met by the first unit, demand is then substantially satisfied by the first unit alone. Also, if all units have been brought up to the required maximum pressure, demand for another operation may be substantially satisfied only by the first unit without materially reducing the pressures in the following units, such greater pressures in the following units being thus held in reserve for higher pressure requirements.

It is therefore further an object to provide an automatically operated stored-up-energy system of multiple units from which pressure withdrawal can be made substantially from only one unit at a time.

A further object is to provide a system permitting a lower pressure, or pressure in a single unit, to be used first, while retaining substantially all of a higher pressure for safety and subsequent application.

Another object is to provide a multiple unit pressure system whereby the pressure in the first unit is dissipated to a balanced unit condition before advancing to the next pressure.

Still another object is to provide a multiple unit pressure system wherein the highest pressure available is automatically applied as a final pressure step.

It is also an object of the invention to provide an automatic pressure applying system of the indicated character whereby automatic continuous repressuring can be carried on without disrupting automatic withdrawal in the system.

Other objects of the invention and various features of operation and construction thereof will become apparent to those skilled in the art upon reference to the following description and accompanying drawings wherein:

FIG. 1 is a combined structural showing and diagrammatic arrangement of associated parts of one application of the invention;

FIG. 2 is a similar showing where plural devices are to be controlled or operated from the same system; and FIG. 3 illustrates a system similar to that of FIG. 1 wherein high pressure gases are used instead of hydraulic fluid, the spent gases being vented to the atmosphere.

In the drawings, the device to be controlled in FIG. 1 is represented by a single oil well blowout preventer P, while in FIG. 2 plural blowout preventers Pa and Pb represent means to be controlled. The only differences in the structures of FIGS. 1 and 2 are found in the connections between the system of this invention and the blowout preventers.

The system of this invention, as shown in both FIGS. 1 and 2, is represented by a series of three pressurizing units in the form of accumulators, a single recharge pump, a series of check valves, and two automatic pressure-transfer valve units or assemblies disposed between the respective accumulators.

*FIG. 1 System*

The system is first described with reference to FIG. 1. As indicated therein, a first pressure accumulator A is followed in the series by an intermediate pressure accumulator B and, in turn, by a final pressure accumulator C. Each accumulator is conventional and is represented by a tank 10 provided with a typical transverse rubber or other elastic diaphragm 12, air or other chosen gas being held above the diaphragm and the diaphragm maintaining separation of the gas from underlying hydraulic liquid of the system. A recharge pump 14 which is connected with the piping of the system, and which is adapted to recharge all of the accumulators A, B and C to the same maximum pressure, is supplied from a hydraulic liquid reservoir 15, as by gravity, such liquid being received back from the equipment being controlled, as by a line 16. A series of ball or other check valves is arranged in the piping as shown to prevent liquid under higher pressure from passing to a lower pressure line or zone.

Thus, an outlet line 18 from the recharge pump 14 contains a check valve 20 preventing back flow of pressurized liquid through the pump. A check valve 22 in a branch or manifold line 23 prevents pressurized liquid in the accumulator B from passing back into the line 23 and its branches and to the accumulator A via its connection 23a. Again, a check valve 24 in a branch or manifold line 25 prevents pressurized liquid in the last accumulator C from passing back to the line 25 and its branches and to the accumulator B via its connection 25a. Another check valve 26 in a branch line 27 from the line 23 opposite the accumulator A prevents higher pressure from passing to the accumulator A, either from the blowout preventer P, or other lines of this system connected therewith. Similarly, a check valve 28 in a branch line 29 leading from the line 25 opposite the accumulator B prevents higher pressure than in the accumulator B from passing to the accumulator B, either from the blowout preventer P, or other lines in this system. Another line 30 leads from the accumulator C and corresponds with the branch lines 27 and 29, but needs no check valve inasmuch as there can be no higher pressure in this system than that in the accumulator C.

Important elements of this improvement involve two automatic pressure-operated pressure-transferring valve assemblies for automatically transferring higher pressures to lower pressure lines connected with the blowout preventer P, or other device being controlled, when and if a reduced pressure in a preceding accumulator is insufficient to operate to desired position the closure for the blowout preventer P, or other device to be closed or pressure operated. The first of these automatic pressure-transferring valve assemblies is indicated at 32 and is located between the branch lines 27 and 29 to work across between a T connection or pressure line 33 leading from the check valve 26 and a similar T connection or pressure line 34 leading from the check valve 28 and its branch line 29. This valve assembly 32 thereby acts to transfer pressure from the accumulator B to the pressure line 33 when the pressure in the accumulator A has been reduced to an inadequate level. The second of these automatic pressure-transferring valve assemblies is indicated at 36 and is located between the branch lines 29 and 30 and their pressure lines 33 and 34 to transfer to the device P the pressure which exists in accumulator C when the pressure in accumulator B has been reduced to a level inadequate to complete the required movements of the device P to be closed or controlled.

The valve assembly 32 has a bored and ported housing 37 and the assembly 36 has a similar housing 38. The middle of the housing 37 is provided on its outlet side with a port connecting with the pressure line or T connection 33 leading from the branch line 27 and its check valve 26 to an appropriate 3-way rotary main valve or master valve 40 whose housing 42 is connected not only with the pressure line or T connection 33, but also with the return line 16 to the reservoir 15 and with a line 44 leading to the blowout preventer P and communicating with a by-pass control line 45 connected with the lower ends (as illustrated) of the assemblies 32 and 36.

The middles of the housings 37 and 38 are interconnected by the pressure line or T connection 34 which leads from the branch line 29 and its check valve 28 supplied by the accumulator B. The opposite side of the housing 38 is connected to the line 30 which is that supplied by the accumulator C.

*Operation of FIG. 1 System*

Considering the operation of the system of FIG. 1, it will be assumed that the accumulators A, B and C have all been charged to the maximum system pressure by the recharge pump 14. Upon movement of the main valve 40 to the position shown in FIG. 1, the accumulator A delivers pressure to the blowout preventer P through the check valve 26 and the main valve 40 to actuate the blowout preventer.

By means of the valve assembly 32, when the pressure in the lines 23, 27, 44 and 45, becomes balanced such balanced pressure now lifts a valve 50 in the housing 37 through operation of its valve stem 51 by differential pistons constituting a pressure responsive means for opening the valve 50, such pressure responsive means including a larger diameter piston 52 working in a cylinder 53 connected with the by-pass control line 45 through a port 54 in a packed nut 55 enclosing the cylinder. The upper end of the valve stem 51 carries the other differential piston 56 of the pressure responsive means which piston 56 is of smaller diameter than the piston 52 and works in a cylinder 57 in a similar packed nut 58 and is connected through a port 59 with the manifold line 23 so as to be exposed to the same balanced pressure and to be lifted by the larger piston 52.

Lifting of the valve 50 now permits the higher pressure of the accumulator B to pass the check valve 28, thence through the housing 37 and via the line or T connection 33 and the main valve 40 to the blowout preventer P or similar control device to be actuated. It will be noted that, under these conditions, the check valve 26 closes to prevent back flow from the accumulator B to the accumulator A. This also prevents the higher pressure in the accumulator B from being applied to the piston 56, whereby the lower pressure in the accumulator A acts on the piston 56 and the higher pressure in the accumulator B acts on the piston 52 to hold the valve 50 fully open.

Upon balanced pressure developing in the line 25 and the by-pass line 45, a valve 50a in the housing 38 is lifted in the same way by a larger piston 52a working against a smaller piston 56a, thus passing the higher pressure of accumulator C past the valve 50a and its seat to the pressure line or T connection 34, thence through the housing 37 past its valve 50 and valve seat (since the valve 50 is still held open by the higher pressure in line 45), and on to the blowout preventer P, or similar device, as before. The valve 50a in assembly 36 will not be opened by its piston 52a so long as a sufficiently higher pressure exists in line 25 than in line 45 to offset the area difference between the pistons 52a and 56a.

In this manner, pressures in the succeeding accumulators B and C are successively passed to the device P to be controlled, as pressures dissipate in preceding accumulators, whether such pressures are initially successively higher in the accumulators or are initially all the same. Thus, if the pressure accumulated in the accumulator A alone is sufficient for the purpose, virtually none is taken from the accumulators B and C, only enough being taken from the accumulators B and C to increase the pressure in the lines leading to the blowout preventer P, and in the blowout preventer itself, to an equilibrium value. Under such conditions, the pressure in the accumulator B will be reduced only very slightly, and that in the accumulator C even less. If the pressures in accumulators A and B only are sufficient, virtually none is taken from the accumulator C, or if only a very little of the pressure from the accumulator C is needed, its pressure is largely reserved for any emergency until such time as the pump 14 has recharged all of the accumulators to the required maximum.

As apparent, the constructions of the assemblies 32 and 36 are alike and the parts of assembly 36 are indicated by the same reference numerals as the parts of assembly 32 with the suffix *a* attached. As is clear from the drawing, the cylinder-providing nuts 55 and 58 are threaded into position against packings 60 which also pack the valve stem 51 carrying the pistons 52 and 56. An internal cage nut 62 is used to provide a valve seat 64 for the tapered valve 50 which, when lifted, supplies a ported chamber 65 feeding the pressure line or T connection 33. As seen, appropriate bores, passages, threads and ports are located to provide the indicated pressurized liquid flow.

The recharge pump 14 preferably is automatically controlled by a pressure switch 70 controlled by the pressure in the tank of the accumulator A, as through a pressure line 72. The main control or master valve 40 is commonly manually operated, but may be automatically actuated for movement to the operating position shown by pressure developing in the device P required to be controlled. When idle, the valve 40 connects the blowout preventer line 44 with the return line 16 for transfer of the hydraulic liquid in the blowout preventer back to the reservoir 15 from which the recharge pump 14 takes its supply.

In practice, with hydraulic closing equipment used in the oil fields, a high percentage of every closing movement can be accomplished with pressure liquid provided substantially entirely by accumulator A alone, but, when required, the remainder of such movement is effected by employing only a very little of the higher pressure liquid in accumulator B; or, in more severe cases, some of the pressure in accumulator C may be used, thereby reserving most of the highest pressure for the rare extreme cases. Thus, most of the pressure in the accumulator A is always available for emergency conditions.

The foregoing discussion is based primarily on the assumption that the blowout preventer P demands pressure with the accumulators A, B and C all charged to the maximum pressure. However, the operation is generally the same with the accumulator A partially discharged, or with the accumulators A and B, or the accumulators A, B and C, partially discharged to progressively lesser degrees. For example, assuming a maximum accumulator pressure of 1,000 p.s.i., the operation is substantially as hereinbefore described even if the accumulator A has previously been discharged to say 500 p.s.i., the accumulator B to say 900 p.s.i., and the accumulator C to say 995 p.s.i., the 5 p.s.i. drop in the accumulator C being for example, that which was necessary to reach pressure equilibrium after drawing upon the accumulators B and C to completely actuate the blowout preventer P. The operation is substantially the same under a third set of pressure conditions resulting from partial recharging of the accumulators A, B and C by the recharge pump 14. For example, the accumulator A may have been recharged to a pressure equal to that in the accumulator B, but less than that in the accumulator C.

FIG. 2 System

The system of FIG. 2 is essentially the same as that of FIG. 1. However, in order to adapt the system to control of plural devices, such as the two blowout preventers Pa and Pb indicated, it is necessary to connect the by-pass manifold line 45 to the pressure line or T conduit connection 33 before the master valve for either blowout preventer Pa or Pb is reached. For this purpose, the pressure line or tee connection 33 is provided with an extension having two branches 33a and 33b. One branch 33a leads to a master valve 40a for the blowout preventer Pa, this master valve 40a being mounted in a valve housing 42a connected with the blowout preventer Pa by a line 44a. The other branch 33b of the pressure line 33 leads to a master valve 40b in a valve housing 42b connected with the blowout preventer Pb by a line 44b. For the purpose of returning spent hydraulic liquid to the reservoir 15, the return line 16 is provided with two branches, one branch 16a connecting the master valve housing 42a with the return line 16, and the other branch 16b connecting the master valve housing 42b with the return line 16.

The effective difference between this connection of the system with the blowout preventers Pa and Pb and the connection of the system with the blowout single preventer P of FIG. 1 is that the line 45 is under the highest pressure when the master valves 40a and 40b are closed, this being by reason of the fact that the branch 45a connecting the by-pass line 45 to the pressure line or T connection 33 is always connected with pressure passing the check valve 26 in the branch line 27, whereby to actuate the device 32 and thus increase the pressure in the line 45 to that passing the check valve 28, thereby actuating the device 36 and establishing the highest pressure in the line 45.

However, the moment that either of the 3-way master valves 40a and 40b is opened, a pressure drop is effected in the line 45 because of its connection with the lower pressure in the blowout preventer, and the differential valves 50 and 50a immediately close. Thus, the pressure of the lowest pressure accumulator becomes effective, and the system then operates exactly as above described in connection with FIG. 1.

Of course, a single device P can be as readily controlled or actuated with this arrangement of FIG. 2 as with that of FIG. 1.

FIG. 3 System

It is also possible, as indicated in FIG. 3, to operate the system of this invention, at least for some purposes, with high pressure gases, rather than to use high pressure liquid accumulators and the like. The spent gases are exhausted to the atmosphere, as by a vent 90, and no attempt at recharging the pressure media is made. With this variation, cylinders or tanks of gases at adequately high pressures are used. These preferably are inert gases, such as nitrogen, but other gases may be used, and even liquefied gases, provided their liquefaction pressures at normal temperatures are sufficiently high to meet the pressure requirements of the system as employed.

As seen in FIG. 3, instead of employing the three described accumulators or equivalent hydraulic means of FIGS. 1 and 2, three high pressure gas cylinders Aa, Bb and Cc are employed, and connected into the system as in FIG. 1, there being only one device P to be actuated. However, two or more devices may be actuated as indicated in FIG. 2.

With this arrangement, when a low pressure cylinder, such as Aa, is spent, the higher pressure cylinders are moved forward, and a new highest pressure cylinder, or tank, or drum, introduced into the line. Rather than to use an elaborate valving system to avoid shifting of the cylinders when a new one is required, each of the connections or lines 23a, 25a and 30 is provided at its terminal with a fitting adapted to be united with a fitting on the end of a shiftable line 80 from each of the cylinders or other supply devices Aa, Bb and Cc. For this purpose each shiftable line 80 is provided with a valve 82 and has a terminal fitting 83 to unite with a fitting 84 at the terminal of each of the connections 23a, 25a and 30 of the system, and each of these connections may have a valve 85. Thus, by closing the valves 82 and 85, the terminal fittings 83 and 84 may be quickly connected and disconnected as desired, especially when these terminals are grouped as indicated, whereby to facilitate manipulation of the fittings.

As is apparent from the foregoing, this invention is not only a notable contribution to the art in economic value but also a notable contribution in better safe-guarding against the loss of high pressures in control devices of the kind. It is to be understood that the patent claims, therefore, are intended to cover all variations within their scope.

The invention claimed is:

1. In combination in automatic pressurizing mechanism: a plurality of fluid pressure units arranged to carry fluids under different pressures and including a first unit and a second unit; means to supply fluid pressure to the first unit; manifold line means connecting said units and supply means; check valve means in said manifold line means to prevent return of higher pressure from said second unit to said first unit and supply means when said first unit and said supply means are under lower pressure than said second unit; a pressure-transfer assembly having an inlet and an outlet connected between said units; means connecting the second unit with the inlet of said transfer assembly; transfer valve means in said assembly for passing higher pressure from said second unit to the outlet of said assembly; valved branch line means connecting said first unit with said pressure-transfer assembly via said manifold line means and said outlet and having a check valve; valved pressure-feeding conduit means connected on one side of its valve with said outlet and said valved branch line means and connected on the other side of its valve to a conduit to supply pressure to a device to be pressure controlled; by-pass conduit means connecting the last named conduit with said assembly at one side of said transfer valve means; branch line means connecting said manifold line means with said assembly at the other side of said transfer valve means; and pressure responsive means comprising differential pistons in said assembly at opposite sides of and connected to said transfer valve means and under the influence of pressures in said by-pass conduit means and in said manifold line means for opening said transfer valve means upon pressure equilization in said by-pass conduit means and said manifold line means.

2. An automatic multiple stage pressurizing system including: a plurality of interconnected fluid pressure units and including a first unit and a last unit; means to supply fluid pressure to the first unit; manifold line means connecting said units and pressure supply means in series; check valve means in said manifold line means to prevent return of higher pressure from higher pressure units to lower pressure units and said supply means; a pressure—transfer assembly disposed between and connected with each pair of adjacent units; line means connecting said last unit of the series with the respective assembly; conduit means connecting adjacent assemblies; a transfer valve in each assembly for passage of higher pressure of one unit connected therewith through such assembly to an outlet conduit connected therewith; valved conduit means connecting said first unit with a first transfer assembly via said manifold line means and the respective outlet conduit; pipe means beyond the valve of said valved conduit means connecting said valved conduit means with a device to be pressurized; branch lines connecting said manifold line means with said connecting conduit means and containing check valve means to prevent higher pressure return to said manifold line means when said manifold line means is at lower pressure; manifold by-pass means connecting said assemblies with said pipe means at one side of each transfer valve; branch lines connecting said manifold line means with said assemblies at the other side of each transfer valve; and pressure responsive means comprising differential pistons in each assembly connected with the valve thereof at opposite sides of the valve for opening the valve upon pressure equalization in said manifold line means and said manifold by-pass means.

3. Automatic plural stage pressurizing apparatus, including in combination: a plurality of interconnected pressure vessels and including a first pressure vessel; check valve means between the vessels to prevent return of higher pressure fluid from a higher pressure vessel to a lower pressure vessel; valved means to supply pressure from said first vessel to a device to be pressure actuated; automatic pressure-transfer means connected to said valved means and said vessels to pass higher pressure from a subsequent vessel in the series to said valved means upon balancing of pressure in said first vessel and said valved means, said pressure-transfer means containing a transfer valve; a manifold line containing said check valve means and connecting said vessels to one another, to said pressure supply means, to said valved means, and to said pressure-transfer means at one side of its transfer valve; another line connecting said valved means with said pressure-transfer means at the other side of said transfer valve; and differential pressure means contained in said pressure-transfer means at opposite sides of such valve and connected with said valve to open the valve upon pressure equalization in said manifold line and said other line.

4. A combination as in claim 3 wherein a pressure-transfer means is arranged in connected relation with each pair of pressure vessels for successive transfer of higher pressures on one side thereof to lower balanced pressures on the other side thereof.

5. An automatic pressuring system including in combination: a plurality of fluid pressure accumulators including first and second accumulators; manifold conduit means connecting said accumulators; check valve means in said manifold conduit means to prevent return of higher pressure in a succeeding accumulator to a lower pressure accumulator; valved means for connecting said first accumulator to a line leading to a device to be pressure actuated; pressure-transfer valve means connected between said second accumulator and said valved means; a by-pass conduit from said line to one side of said pressure-transfer valve means; a conduit from said manifold conduit means to the other side of said pressure-transfer valve means; pressure responsive means connected to said transfer valve means and operable by pressures in said line and said manifold conduit means for opening said transfer valve means upon equalization of pressure in said line and said manifold conduit means; means to supply pressure to the first accumulator; and pressure-controlled means connecting said first accumulator with said pressure supplying means for automatically energizing said pressure supplying means upon drop of pressure in said first accumulator below a predetermined minimum, said check valve means passing higher pressures to succeeding accumulators upon higher pressure build-up by said pressure supplying means.

6. A combination as in claim 5 wherein pressure-transfer valve means are respectively connected between pairs of successive accumulators to receive and transfer sucessively increasing pressures from such successive accumulators to said valved means in said line leading to said device to be pressure actuated.

7. An automatic pressuring system including in combination: a plurality of fluid pressure vessels including first and second pressure vessels; manifold conduit means connecting said pressure vessels; check valve means in said conduit means to prevent return of higher pressure in a succeeding pressure vessel to a lower pressure vessel; valved means for connecting the first pressure vessel to a line leading to a device to be actuated; pressure-transfer valve means connected between said second pressure vessel and said valved means; a by-pass conduit from one side of said pressure-transfer valve means to said line; a conduit from said manifold conduit means to the other side of said pressure-transfer valve means; pressure responsive means connected to said pressure-transfer valve means and operable by pressures in said by-pass conduit and said manifold conduit means for opening such transfer valve means upon increase of pressure in said by-pass conduit over that in said manifold conduit means; means to supply pressure to the first pressure vessel; and pressure-controlled means connecting said first pressure vessel with said pressure supplying means for automatically energizing said pressure supplying means upon drop of pressure in said first pressure vessel below a predetermined minimum, said check valve means passing higher pressures to succeeding pressure vessels upon higher pressure build-up by said pressure supplying means.

8. A combination as in claim 7 wherein pressure-transfer valve means are respectively connected between pairs of successive pressure vessels to receive and transfer successively increasing pressures from successive pressure vessels to said valved means in said line leading to said device to be actuated.

9. In combination: first and second pressure vessels; means for connecting said first pressure vessel to a device to be pressure actuated; and pressure responsive valve means for connecting said second pressure vessel to the device to be pressure actuated when the pressure in said first pressure vessel is below a predetermined minimum value, said pressure responsive valve means having an inlet connected to said second pressure vessel and an outlet connectible to the device to be pressure actuated and including a valve movable from a closed position to an open position to establish fluid communication between said inlet and said outlet, said pressure responsive valve means further including differential area piston means having opposed large and small areas facing in directions such that pressures acting thereon respectively bias said valve toward its open and closed positions, whereby said valve is in said closed position as long as the pressure acting on said small area exceeds the pressure acting on said large area by more than a predetermined amount, said small area communicating with and being exposed to the pressure in said first pressure vessel and said large area communicating with and being exposed to the pressure in said outlet.

10. In an apparatus for delivering pressure to a device to be pressure actuated, the combination of: first and second pressure vessels; means for connecting said first pressure vessel to said device; and pressure responsive, differential area, valve means for connecting said second pressure vessel to said device when the pressure in said first pressure vessel and the pressure in said device approach balance, said valve means having opposed small and large areas respectively connected to said first pressure vessel and to said device.

References Cited in the file of this patent
UNITED STATES PATENTS

| | | |
|---|---|---|
| 1,849,702 | Bard | Mar. 15, 1932 |
| 2,261,026 | Heigis | Oct. 28, 1941 |
| 2,408,799 | Melichar | Oct. 8, 1946 |
| 2,623,535 | Morgan | Dec. 30, 1952 |
| 2,945,352 | Stelzer | July 19, 1960 |

UNITED STATES PATENT OFFICE
CERTIFICATE OF CORRECTION

Patent No. 3,044,481                                          July 17, 1962

Joseph E. Regan

It is hereby certified that error appears in the above numbered patent requiring correction and that the said Letters Patent should read as corrected below.

Column 2, line 2, for "unit" read -- pressure --; line 3, for "pressure" read -- unit --; column 5, line 56, for "blowout single" read -- single blowout --.

Signed and sealed this 11th day of December 1962.

(SEAL)
Attest:

ERNEST W. SWIDER                                    DAVID L. LADD
Attesting Officer                                       Commissioner of Patents